(12) United States Patent
Ballard

(10) Patent No.: US 6,236,661 B1
(45) Date of Patent: May 22, 2001

(54) ACCELERATING ACCESS TO WIDE AREA NETWORK INFORMATION

(75) Inventor: Clinton L. Ballard, Suquamish, WA (US)

(73) Assignee: Acceleration Software International Corporation, Poulsbo, WA (US)

( * ) Notice: Subject to any disclaimer, the term of this patent is extended or adjusted under 35 U.S.C. 154(b) by 0 days.

(21) Appl. No.: 09/019,325

(22) Filed: Feb. 5, 1998

(51) Int. Cl.[7] .................................................. H04L 12/28
(52) U.S. Cl. ............................................ 370/410; 713/176
(58) Field of Search .................................... 370/410, 409; 717/11, 204; 707/102–104; 709/204, 220, 217, 200; 379/202, 200; 713/176, 177, 200

(56) References Cited

U.S. PATENT DOCUMENTS

| | | | |
|---|---|---|---|
| 5,872,848 | * | 2/1999 | Romney et al. ..................... 713/176 |
| 5,943,435 | * | 8/1999 | Gaborski .............................. 382/132 |
| 5,950,205 | * | 9/1999 | Aviani .................................. 707/103 |
| 5,958,051 | * | 9/1999 | Renaud et al. ....................... 713/200 |
| 5,995,682 | * | 11/1999 | Pawlicki et al. ..................... 382/300 |
| 6,044,205 | * | 2/2000 | Reed et al. ........................... 707/104 |

OTHER PUBLICATIONS

Chankhunthod, Anawat, et al.; "A hierarchical Internet Object Cache" (downloaded from Internet prior to filing date).

* cited by examiner

Primary Examiner—Wellington Chin
Assistant Examiner—Premell Jones
(74) Attorney, Agent, or Firm—Steven P. Koda, Esq.

(57) ABSTRACT

Portions of the internet are embedded onto a transportable media, then delivered periodically to subscribing clients. The contents are indexed to relate a given document to a URL and a time stamp. During on-line access to the internet, the transportable media serves as a read only cache. After issuing a command to view a document at a given URL, a test is performed to see if the document stored on the media is up to date. A command is sent over the internet to identify the date for the most recent update of the document. If the identified date is more recent then the corresponding time stamp, the media version is out of date. So the document is downloaded and displayed. If, however, the time stamp is the same or more recent then the identified date, the document as stored on the media is displayed.

17 Claims, 7 Drawing Sheets

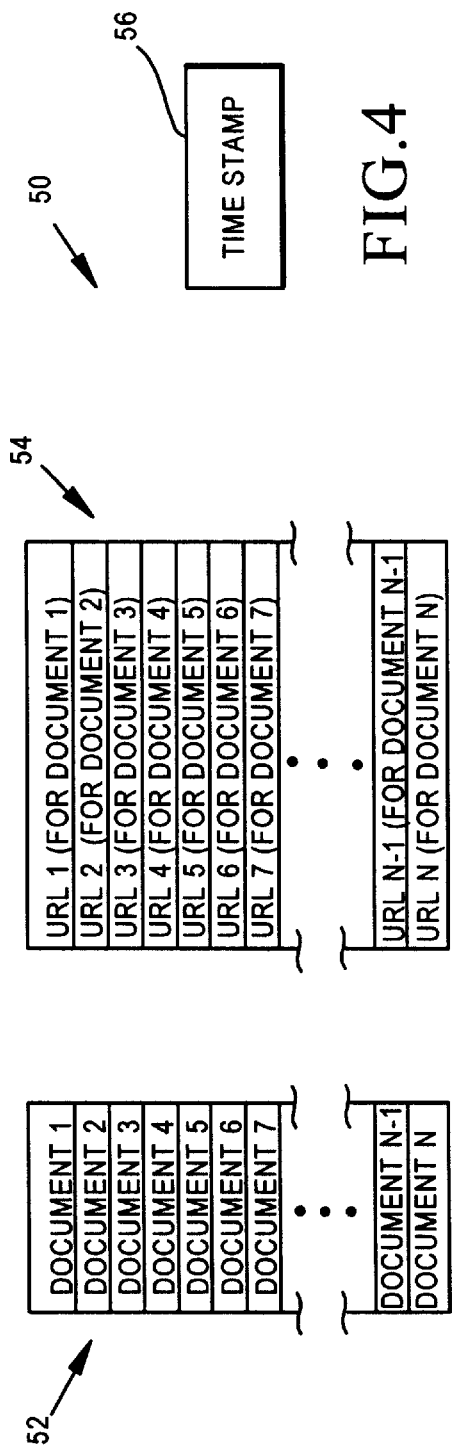
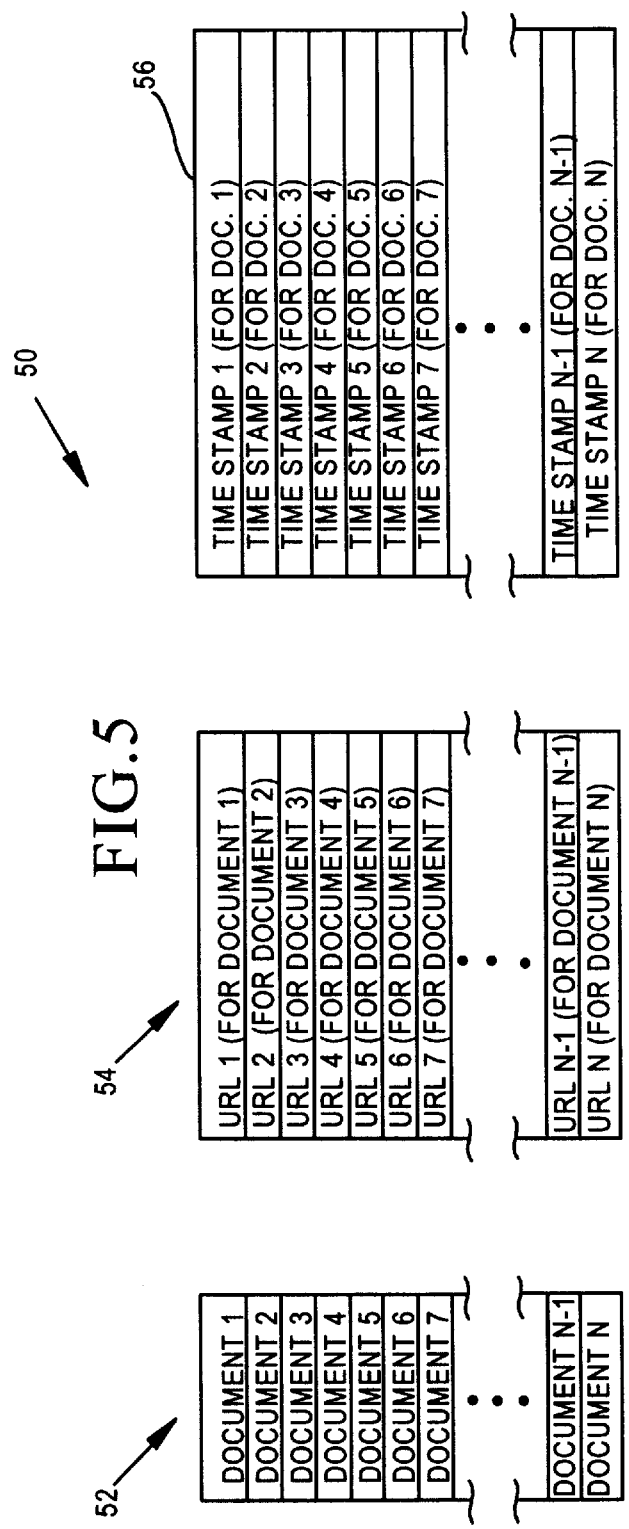
FIG. 4
FIG. 5

ACCELERATING ACCESS TO WIDE AREA NETWORK INFORMATION

BACKGROUND OF THE INVENTION

This invention relates to hierarchical caches for wide area networks, and more particularly to a method and apparatus for reducing average latency when downloading information from a wide area network.

Wide area networks such as the internet, and similar intranets, are being used increasingly for accessing information and for communicating among individuals and businesses. Conventionally, an end user computer accesses the wide area network by a wired or a wireless transfer medium. A user accesses the internet, for example, using a modem and the standard telephone communication network. Alternative carrier systems such as cable and satellite communication systems also are being contemplated for delivery of internet and wide area network services. The formal definition of the "Internet" is the global information system that (i) is logically linked together by a globally unique address space based on the Internet Protocol (IP) or its subsequent extensions/follow-ons; (ii) is able to support communications using the Transmission Control Protocol/Internet Protocol (TCP/IP) suite or its subsequent extensions/follow-ons, and/or other IP-compatible protocols; and (iii) provides, uses or makes accessible, either publicly or privately, high level services layered on the communications and related infrastructure. The term "Internet" is commonly used to refer to the physical structure, including client and server computers and the phone lines that connect everything into a global information system. The common categories of information services available over the internet include information retrieval services, information search services, communication services, and multimedia information services. The information retrieval services include FTP and Gopher. The information search services include WAIS, Archie, and Veronica,. The communication services include Email, Telnet, USENET, and IRC. The multimedia information services include the World Wide Web (WWW).

The WWW is an increasingly popular service of the internet. Documents accessed over the WWW are ASCII documents that contain commands from a language called HTML (hypertext markup language). HTML commands allow a programmer to tag passages of text. The tag is used by a web browser application at the client computer to format the text for display. Tagging allows effective text formatting (e.g., larger text for heading, bold or italic text for emphasis). HTML also allows in-line images to be included. Another feature of HTML is hypertext links. Hypertext links allow a client to load another WWW document by clicking a link area on the display screen. A document may contain links to many other related documents. The related documents may be on the same computer as the first document, or may be on a computer on the other side of the world. A link area typically includes a word, group of words, or a picture.

One of the challenges in supporting the growing number of end users and the increasing amount of information available through the internet is delivering such information content to the end user in a timely manner. Using the conventional public telephone communication system and 28.8 kbaud modems data is transferred at a rate of not more than approximately 3 kilobytes per second. For multimedia documents on the world wide web, there often is a substantial delay waiting for a document with included images to be downloaded.

For general purpose computing on a general purpose computer, a common way of improving access to data is to store data in a cache. Upon an initial request the data is accessed from the main source of such data and stored in the cache. For subsequent accesses the data then can be accessed from the cache. The cache generally has a much faster access response time than the main data source. Conventional web browser software programs typically set up a multi-megabyte cache on an end user's computer to improve access time. Such caches generally are temporary data structures storing data which may remain valid while the web browser is running or while the end user is on-line.

Temporary disk caches, along with conventional RAM caches and file caches are useful for re-accessing the same data within a relatively short period of time. However, they do not address the concern a user has over waiting 10 seconds, 30 second, 1 minute or longer for a Uniform Resource Locator (URL) to initially access a WWW page at a remote site, and download such page to the client for viewing. Accordingly there is a need for reducing the time which an end user waits for information to be downloaded over a wide area network, such as the internet. Such waiting time is referred to herein as a latency time. One solution for reducing the latency time is to increase the throughput rate for modem transfers. This inventions relates to an alternative approach.

SUMMARY OF TIHE INVENTION

According to the invention, all or a portion of the information content of a wide area network is embedded onto a transportable media, distributed to clients, and updated periodically. The current version of the transportable media then is used as a cache during on-line access to the wide area network.

According to one aspect of the invention, portions of the internet, or another wide area network, are embedded onto a transportable media, such as a CD-ROM, then delivered to subscribing clients (e.g., independent service providers (ISO); end users). A given transportable medium, for example, may include all or much content of the network in a given language (e.g., Japanese), all or much content residing on internet servers within a given country, all or much content of the network for a given topic category or topic categories.

According to another aspect of the invention, the transportable medium is replaced periodically with a more current version of the information content. In one implementation clients subscribe to a service which periodically or aperiodically provides a transportable media with desired content.

According to another aspect of the invention, the transportable media serves as a read only cache during on-line access to the network. Typically such cache serves as a secondary cache or other hierarchical cache. A host computer for the media typically includes a RAM cache and a disk cache or file cache having a more immediate access level in the hierarchy. For implementation on an end user's computer, the information stored on the transportable media is accessible only while the user is on-line and requesting access to a given URL that has its information stored on the transportable media. Thus, the end user accesses the internet and while on-line issues commands for accessing various internet documents, (e.g., web pages). For an up to date document located on the transportable media, the document is displayed using the transportable media version, rather than downloading the document over the wide area network.

According to another aspect of the invention, the transportable media content is indexed to relate a given document to a URL and a time stamp. The document may be, for example, the information content for a given web page or URL. The URL serves as an address for the document on the wide area network. The time stamp is a time and date for the document. Such time and date may be the time at which such information was stored, pressed or embedded onto the transportable media or the date for the most recent update of the information (document) at the given URL at the time the document was copied onto a master copy of the transportable media.

According to another aspect of the invention, either before or after loading information from the transportable media for display, the URL for such information is tested to see if the information on the media is up to date. Even before such test, however, the hierarchy of accesses is to be met. Upon issuing a command to view information at a given URL, before requesting that such information be downloaded over the internet connection, the resident caches are tested. If present in RAM cache, then the data from the RAM cache is used. If not, then if present in a resident disk cache or file cache, then the data from such cache is used. These caches correspond to cache structures for temporary data (e.g., for a current log-on session; a general purpose cache). If not present in these general purpose or temporary caches, then the transportable media cache is checked to see if the data is present. If present, then the test is performed to see if the data is up to date. To do such test, a command is sent over the wide area network to identify the date for the most recent update of the information (document) at the desired URL. If the identified date is more recent then the date in the time stamp for such document as stored on the transportable media, then the media data for such document is out of date. Accordingly, the information is downloaded over the network connection and presented to the end user for viewing. If, however, the time stamp date is the same or more recent then the identified date retrieved by command, then the information stored on the transportable media for such document is current. Accordingly, the information content stored on the transportable media for such document is presented to the viewer.

In one embodiment the document is not displayed until after the time stamp test is performed. Depending on the results of the test, the document as found on the transportable media is displayed or the document as downloaded from the wide area network is displayed. In another embodiment, if the document is not present in the general purpose or temporary caches and is present on the transportable media, then the document as stored on the transportable media is displayed. This document version, however, may be out of date. Thus, the time stamp test is performed to determine if it is out of date. If not out of date, then the document is already displayed, so time has been saved. If the document is out of date based on the time stamp test, then the document is downloaded from the wide area network. In some embodiments the document as downloaded then is displayed replacing the displayed version of the document from the transportable storage media. In other embodiments the content of the document as downloaded is compared to the document as displayed to determine if the document has in fact changed. Even though the time stamp has changed, the document may not have changed. Thus, the content is compared. If the content has changed, then the downloaded version is displayed. If the content has not changed, then the currently displayed version from the transportable media continues to be displayed.

According to another aspect of this invention, a disk cache or file cache is set up for wide area network data. This cache is tested before the transportable media to see if a requested document is present. If present, then the document from the cache is displayed. This disk cache not only caches wide area network documents, but also stores a permanent copy of updated time stamps for documents stored on the transportable media which have an out of date time stamp, but not an out of date document. These time stamps are stored in an updated time stamp table.

As previously described, a document's version date as stored on the wide area network may have changed without the document content having changed. In such case the document data as stored on the transportable storage media can still be used to display the document. The table of updated time stamps is tested before performing the time stamp comparison between a downloaded version date and the transportable storage media time stamp. Note that this cached time stamp in effect replaces the time stamp as stored on the transportable storage media during a subsequent comparison of the time stamp with the document version date retrieved over the wide area network. In some embodiments a document's data content is considered not to have changed when the only change is in a date field found in the document or in a counter field of the number of times the document (e.g., web page) has been accessed).

According to one advantage of the invention, the average latency time from the time an end user issues a command to display a specific document to the time that such document is displayed is greatly reduced for transportable storage media documents which are updated only infrequently. Further, for a user who repeatedly accesses a common portion of the internet, overall latency time for accessing documents is greatly reduced when such portion is stored on the transportable media. According to another aspect of the invention, overall latency time for downloading a foreign language document is greatly reduced when all or much of the internet content in such language is provided on a transportable media periodically and accessible as a read only cache during on-line access. These and other aspects and advantages of the invention will be better understood by reference to the following detailed description taken in conjunction with the accompanying drawings.

BRIEF DESCRIPTION OF THE DRAWINGS

FIG. 4 is a diagram of the functional content of the transportable storage media of FIG. 2 according to an embodiment of this invention;

FIG. 5 is a diagram of the functional content of the transportable storage media of FIG. 2 according to another embodiment of this invention;

DESCRIPTION OF SPECIFIC EMBODIMENTS
Host Network Environment

Figure 1:
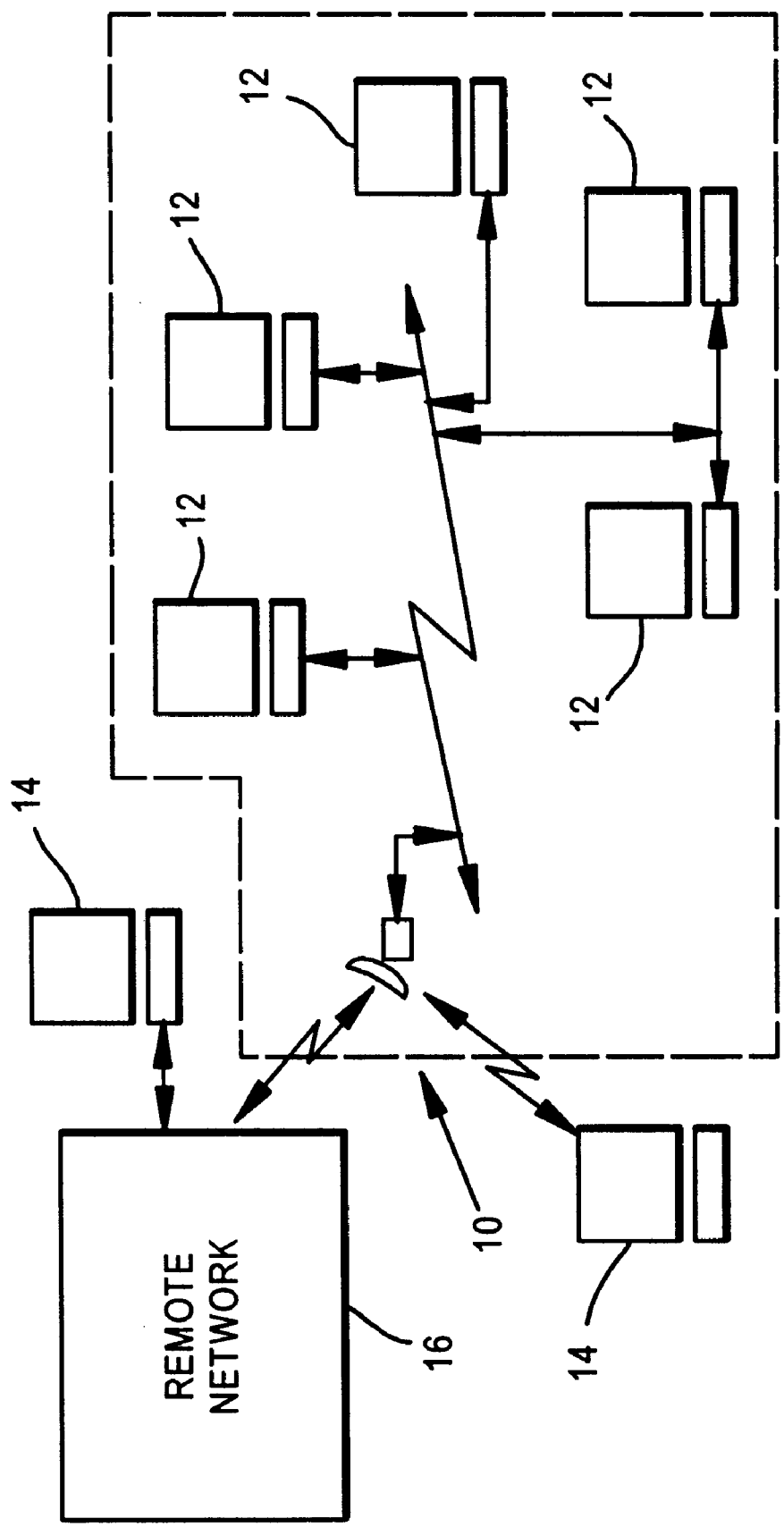
FIG. 1 is a schematic diagram of a wide area network.

FIG. 1 shows a wide area network 10 formed by a plurality of network server computers 12 which are interlinked. Each network server computer 12 stores documents accessible to other network server computers 12 and to client computers 14 and networks 16 which link into the wide area network 10. The configuration of the wide area network 10 may change over time as client computers 14 and one or more networks 16 connect and disconnect from the network 10. For example, when a client computer 14 and a network 16 are connected with the network servers computers 12, the wide area network includes such client computer 14 and network 16. As used herein the term computer includes any device or machine capable of accepting data, applying prescribed processes to the data, and supplying results of the processes.

The wide area network 10 stores information which is accessible to the network server computers 12, remote networks 16 and client computers 14. The information is accessible as documents. The term document as used herein, includes files (as per the Windows operating system usage), documents (as per the MacOS operating system usage), pages (as per the web phraseology usage, and other records, entries or terminology used to describe a unit of a data base, a unit of a file system or a unit of another data collection type, whether or not such units are related or relational.

The network server computers 12 are formed by main frame computers minicomputers, and/or microcomputers having one or more processors each. The server computers 12 are linked together by wired and/or wireless transfer media, such as conductive wire, fiber optic cable, and/or microwave transmission media, satellite transmission media or other conductive, optic or electromagnetic wave transmission media. The client computers 14 access a network server computer 12 by a similar wired or a wireless transfer medium. For example, a client computer 14 may link into the wide area network 10 using a modem and the standard telephone communication network. Alternative carrier systems such as cable and satellite communication systems also may be used to link into the wide area network 10. Still other private or time-shared carrier systems may be used. In one embodiment the wide area network is a global information network, such as the internet. In another embodiment the wide area network is a private intranet using similar protocols as the internet, but with added security measures and restricted access controls. In still other embodiments the wide area network is a private, or semiprivate network using proprietary communication protocols.

The client computer 14 is any end user computer, and may also be a mainframe computer, minicomputer or microcomputer having one or more microprocessors. The remote network 16 may be a local area network, a network added into the wide area network through an independent service provider (ISP) for the internet, or another group of computers interconnected by wired or wireless transfer media having a configuration which is either fixed or changing over time. Client computers 14 may link into and access the wide area network 10 independently or through a remote network 16.

Computer System

Figure 2:
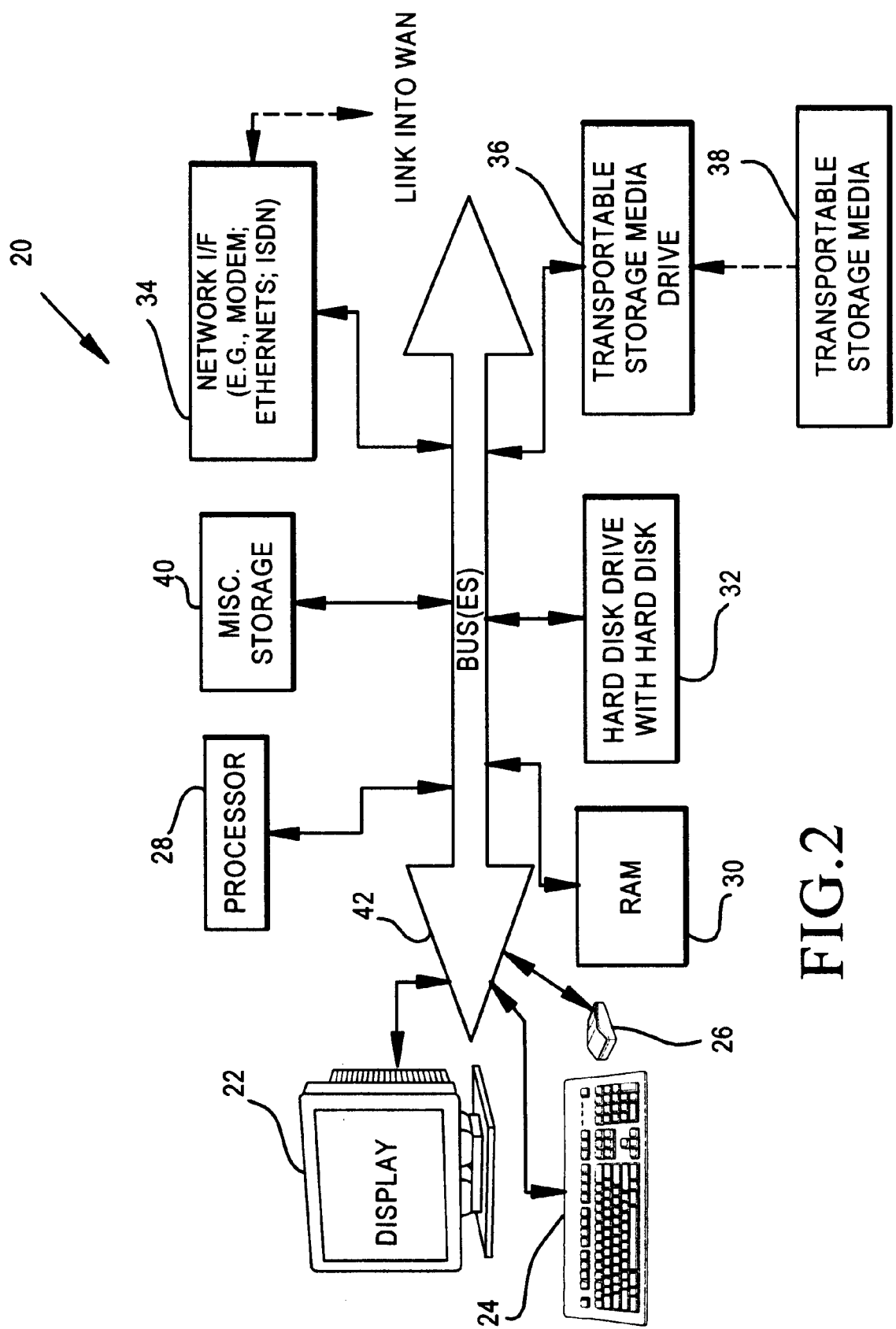
FIG. 2 is a block diagram of a computer system for a computer connected into the wide area network of FIG. 1.

The functions of the present invention preferably are performed by programmed digital computers of the type which are well known in the art, an example of which is shown in FIG. 2. A computer system 20 has a display monitor 22, a keyboard 24, a pointing/clicking device 26, a processor 28, random access memory (RAM) 30, a non-volatile storage device such as a hard disk drive 32, a communication or network interface 34 (e.g., modem; ethernet adapter), and a transportable storage media drive 36 which reads transportable storage media 38. In addition other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the keyboard 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced-feature network terminal device.

The transportable storage media 38 preferably has a large capacity of 1 gigabyte or more, although smaller capacities of 500 megabytes or larger also may be used. The best mode capacity will vary with the specific implementation of this invention. In one embodiment the transportable storage media drive 36 is an optical disk drive, such as a CD-ROM drive or a read/write optical disk drive. Other high capacity media drive types and technologies may be used, also.

Memory Space and Cache Devices for the Computer System

Figure 3:
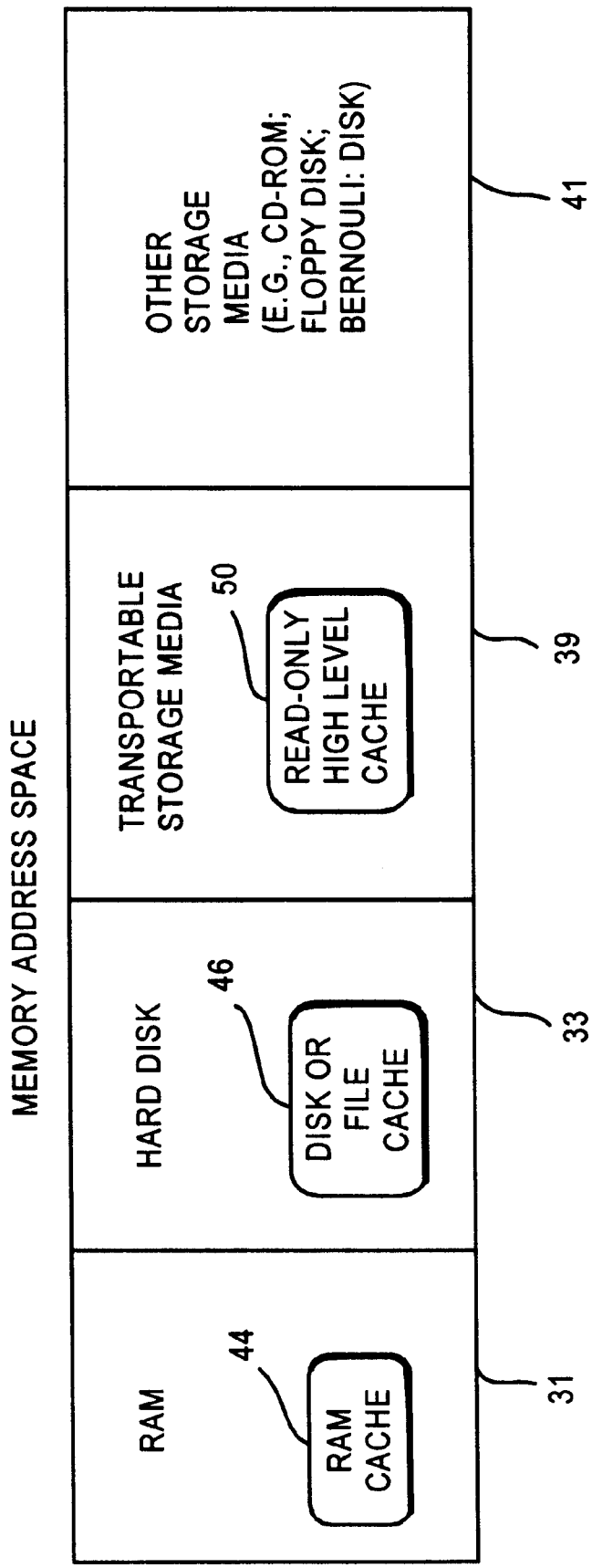
FIG. 3 is a diagram of memory address space for the computer system of FIG. 2.

FIG. 3 shows a memory address space for the computer system 20 of FIG. 2. The computer system 20 includes several memory storage devices 30, 32, 36, 40, and thus has an address space encompassing the capacity of such devices. There is a ram address space 31 for the random access memory 30, a hard disk address space 33 for the hard disk drive 32, a transportable media address space 39 for the transportable media drive 36, and other storage media address space 41 for the other storage media 40. Such address spaces may be implemented as physical address space and expanded to include virtual address space.

Typically the computer system 20 will use some of the address space to implement one or more cache devices. A cache is a special memory subsystem into which frequently used data is copied and stored for quick access. When data is requested, the cache is checked first to see if the data is present. If present and valid, then the data is retrieved from the more quickly accessed cache, instead of the more slowly accessed owner storage media. Conventional computer systems often include cache memory on the microprocessor chip and in RAM. In addition, it is known to include a disk-based cache or a file-based cache on a hard disk.

FIG. 3 shows a portion of random access memory allocated to serve as a RAM cache 44 and a portion of the hard disk address space (e.g., physical address space or virtual address space) to serve as a disk cache or a file cache 46. According to an aspect of this invention, all or a part of the transportable storage media 38 serves as a higher-level cache 50. In a CD-ROM embodiment, the high-level cache 50 is a read-only cache. For example, in one implementation the RAM cache 44 is a primary cache, the disk or file cache 46 is a secondary cache and the high-level cache is a specialized tertiary cache. In some embodiments there are one or more disk or file caches 46. In one embodiment a disk or file cache 46 is dedicated to serve as a cache for wide area network data.

As described below the high-level cache 50 is used for storing documents located elsewhere in the wide area network 10. In addition, the high-level cache differs from conventional cache devices in that the computer system 20 which is using the media 38 as a cache typically is not the computer system which stored the documents onto the media 38. More specifically, the documents are not loaded onto the media 38 in the manner which is common for cache devices. To initially store data in a cache, a typically cache device retains a copy of data when the data is requested elsewhere (e.g., by a processor). For the cache 50 of this invention the data (i.e., documents) are present from the initial request for the document.

FIG. 4 shows the functional organization of the high-level cache 50. The cache 50 includes a plurality of documents 52, a plurality of address identifiers 54 and a time stamp 56. There is an address identifier 54 for each document 52 stored. In one embodiment the cache 50 store documents located on the internet. The address identifiers for such documents are referred to as uniform resource locators (URLs). In one embodiment there is a single time stamp 56 corresponding to all the document 52. In another embodiment, as shown in FIG. 5, there is a separate time stamp 56 for each of one or more documents 52.

For embodiment including a disk or file cache 46 dedicated to storing wide area network data, the cache 46 stores documents as retrieved from the wide area network or the transportable storage media 38. An exemplary capacity for such dedicated cache residing on the hard disk 32 may be 100 MB. For the FIG. 5 embodiment of the transportable storage media format, the dedicated cache 46 also stores a table of updated time stamps 56. Such table include time stamps for at least those documents on the transportable storage media 38 that have been found to have an out of date time stamp, but up to date document data.

The Problem Addressed

The problem addressed by this invention is the prolonged waiting time for documents to be downloaded from the wide area network to the client computer 14 requesting to view a given document. An end user at a client computer 14 will trigger a command to view a specific document located elsewhere in the wide area network 10. Assuming the computer 14 is already connected on-line to the wide area network, the command is relayed over the wide area network to the network server computer 12 which owns the document. Such document then is downloaded from such network computer server 12 through the wide area network to the client computer 14. The client computer 14 then formats and displays the document for viewing by the end user. For internet applications, the process may vary somewhat because some documents (e.g., popular documents) may be located on more than one server computer 12. Such multi-location of some internet documents avoids bottlenecks and significant slowing of internet communications.

The time period from when an end user requests that a document be viewed to the time such document is displayed for viewing is referred to herein as latency time. It is desirable to minimize latency time. One of the difficulties in reducing latency time is the limited bandwidth of the requesting computer's network interface. Consider a client computer 14 embodied by the computer system 20 having a modem connection. Conventional modems run at 28.8 kbaud for network access over the conventional public telephone switching system. In special connection situations 56 kbaud connections also may be achieved. It also is known to provide special digital connections using ISDN technology and ISDN modems. These devices achieve transfer rates of 128 kbaud. The vast majority of end users accessing the internet for example, use the 28.8 kbaud modem connection or a slower connection. At such a transfer rate, data rates of approximately 3.3 kilobytes per second are achievable. When viewing multimedia documents or web page documents the latency time can be 10 seconds or higher. When the time to locate and access a host network server computer 12 having the desired document is factored in, the latency time can be 20 seconds or longer. With the growing popularity of the world wide web, latency time is an increasing problem in delivering effective internet access. When latency times get too high, the end users get frustrated and the internet communications get thwarted. Therefore, it is desirable to provide methods for reducing latency time.

According to this invention, the above problem is addressed by embedding or storing a copy of multiple documents from the wide area network onto a transportable storage media and distributing the transportable storage media. Such media then is accessed by the client computer in lieu of downloading a given document over the wide area network. In a vendor client distribution system embodiment, this process is repeated periodically at regular or irregular intervals to press and distribute updated wide area network content.

Method for Reducing Latency Time

Figure 6:
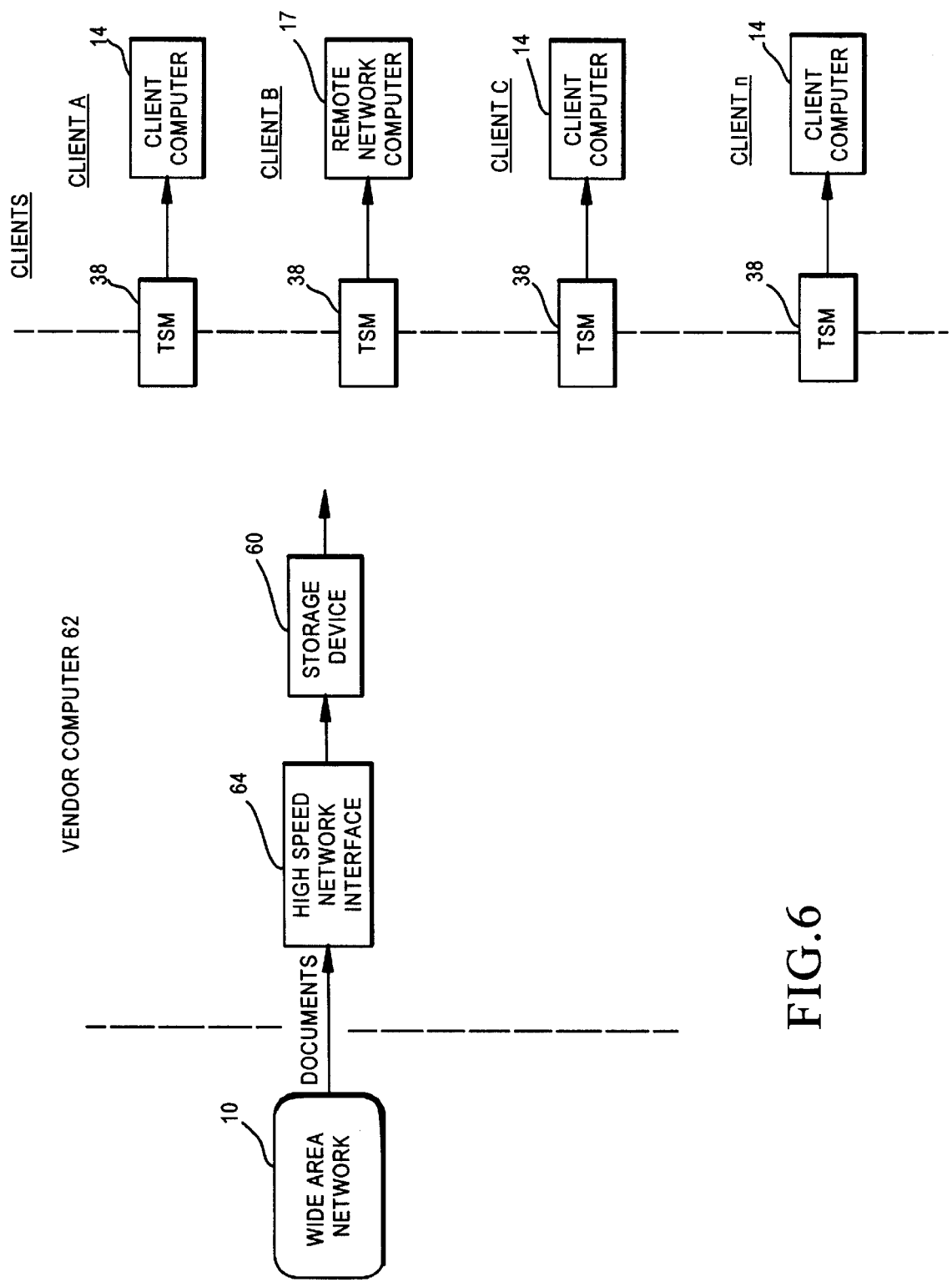
FIG. 6 is a block diagram of a vendor client distribution system for implementing a method embodiment of this invention.
Figure 7:
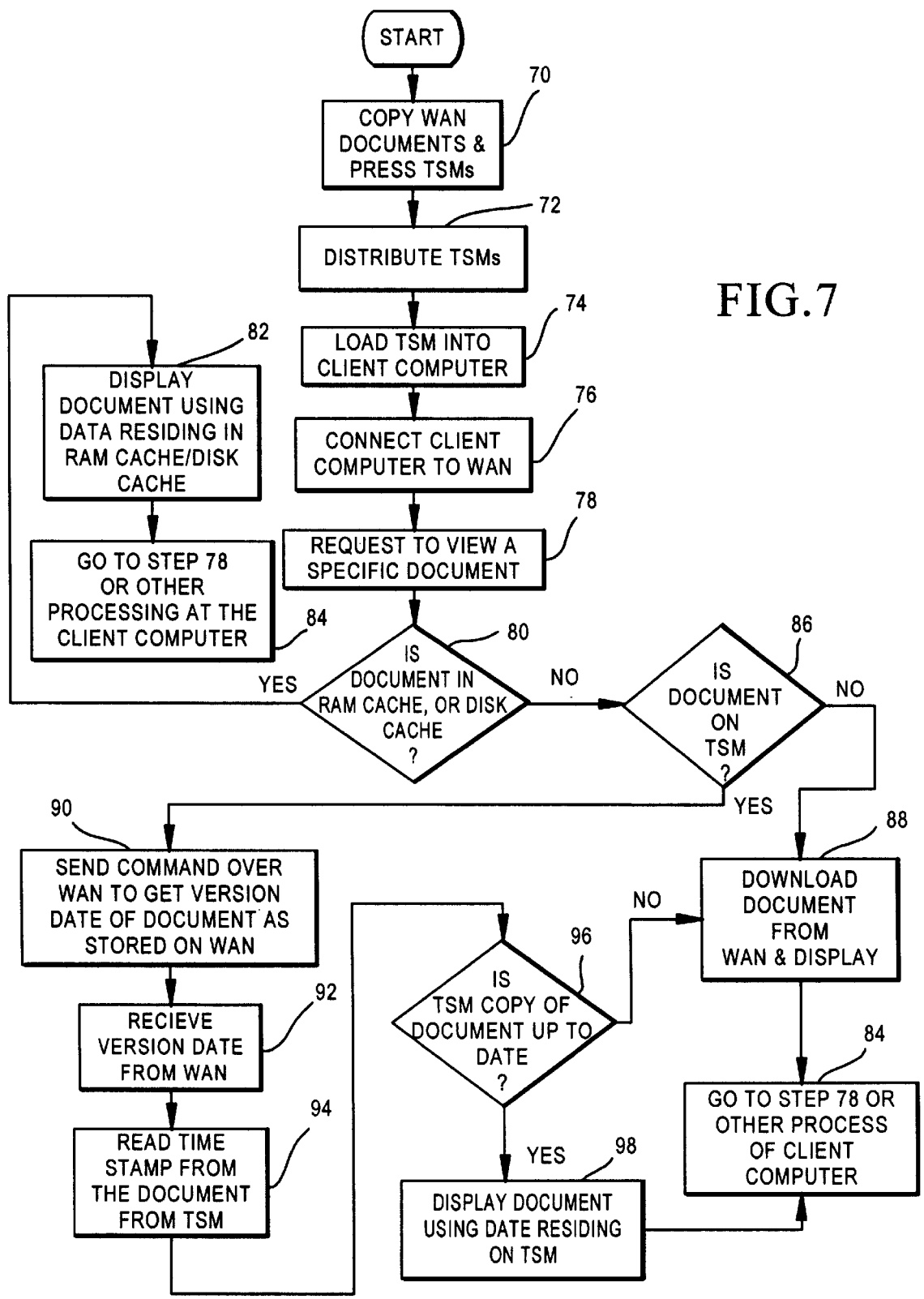
FIG. 7 is a flow chart of a method for reducing latency time according to an embodiment of this invention.

FIG. 6 shows a vendor-client distribution system according to an embodiment of this invention. FIG. 7 shows a flow chart of a method for reducing latency time according to an embodiment of this invention. At one step 70 a plurality of documents are copied off the wide area network 10 onto a storage device 60 at a vendor computer 62. The vendor computer preferably accesses the wide area network 10 through a high speed network interface 64. Exemplary embodiments for the interface 64 include an ISDN modem, a direct cable system hook-up, a broadband satellite communication hook-up or other transfer medium. The documents then are copied onto one or more transportable storage media 38. In one embodiment a master disk is pressed. Such disk then is duplicated to generate multiple copies for the respective clients of the vendor. The transportable storage media 38 store the documents, address identifiers for the documents and one or more time stamps as shown in FIGS. 4 and 5. In the FIG. 4 embodiment there is one time stamp for the entire media 38. This corresponds to the time at which the documents begin downloading from the wide area network to the storage device 60. In a FIG. 5 embodiment the version date (e.g., most recent update date) of the document is downloaded with the document and stored as the time stamp. In an alternative FIG. 5 embodiment the time at which a given document begins to be downloaded to the storage device 60 is used as the time stamp for such document. A separate time stamp thus is stored for each document for such alternative embodiment. In some embodiments the data stored on the transportable storage media is stored in compressed format so that more information can fit on a transportable storage media of a given capacity.

The documents downloaded from the wide area network are selected by prescribed, selectable or programmable criteria. For example, the content of the entire wide area network may be pressed onto the transportable storage media 38 where the media 38 has sufficient capacity. In another example, the entire content of a given portion of the wide area network may be downloaded and pressed onto the transportable storage media 38. For example, the portion of the internet in Japan or another country may be of sufficient capacity to be stored on the transportable storage media. Alternatively, the entire content of documents in a given language may be downloaded. In another alternative documents in a given indexing category of the wide area network may be stored, (e.g., entertainment; government; religion; reference; medicine). There are many different criteria which may be used. Such criteria may be used to store documents for particular market niches (e.g., law; medicine; computers) or industries (e.g., plastics, pharmaceutical; sports). Conventional search engines may be used to identify and/or retrieve documents in the desired category or categories for storage on the storage device 60.

Once the transportable storage media 38 have been pressed or otherwise loaded with the documents, document address identifications and time stamp(s), the media 38 are distributed to the clients. The clients then access the wide area network through a client computer 14, such as a computer system 20 shown in FIG. 2. The transportable storage media 38 is loaded into the transportable storage media drive 36 of such computer system 20. Preferably, the content of the storage media 38 is not accessible other than as a read-only cache during on-line access to the wide area network 10.

Thus, at step 70 the documents are copied from the wide area network 10 onto the storage device 60 to obtain a current version of a select portion of the documents stored in the wide area network. A select portion as used herein means all or a lesser portion of the content stored on the wide area network during the copying period. At step 72, transportable storage media 38 including such current version are distributed to various clients. These steps 70, 72 of copying and distributing are repeated periodically at regular or irregular intervals for clients who subscribe to an ongoing service for updates of the transportable storage media document content.

At step 74, the transportable storage media 38 is loaded into the transportable storage media drive 36 of the client computer 14. At step 76 the client computer 14 connects to the wide area network. For an internet implementation, the client computer typically logs on as a client under a given domain node of the internet (e.g., through an internet service provider or the client's own internet access connection). The step 74 of loading the media 38 may occur either before or after the step 76 of connecting. At step 78 the client computer generates a request to view a document. Typically a user of the computer selects a document by typing in the URL for the document, by selecting the document from a favorites list, by selecting the document from a list of search results, or by selecting the document by hypertext link from another document. The request as issued over the wide area network 10 includes at the least an address identification for the document (e.g., a URL). Before the request is transmitted onto the wide area network 10, however, at step 80 the local cache devices (e.g., RAM cache 44 and disk cache 46) are tested to see if the document is already present. If it is located in one of these cache devices, then at step 82 the document is displayed using the data stored in the local cache 44, 46. Thereafter, at step 84 normal processing is resumed at the client computer 14. Such normal processing may include requesting viewing of another document (e.g., step 78), disconnecting from the wide area network, issuing another network access command using network interface software, shutting down the computer, switching to another application of the computer, or any of various other processing capabilities of the client computer 14.

If the document requested is not in the local RAM cache or disk cache, then at step 86 a search for the document on the transportable storage media 38 occurs. Such transportable storage media 38 serves in effect as a read-only cache for processing document access requests to documents located on the wide-area network 10 during on-line access to the wide area network 10. If the document is not present, then the request is transmitted over the wide area network and the document is downloaded from the wide area network and displayed at step 88. Also during this step 88, such document as downloaded may also be stored in the RAM cache 44 and/or disk cache 46 to improve access time for subsequent requests to view the document. Typically, the document will only reside in such cache devices 44, 46 for a relatively short time. Such caches devices 44, 46 typically are general purpose caches which cache all data requests, not just requests for documents on the wide area network 10. Thereafter, at step 84 normal processing is resumed at the client computer 14.

If the decision at step 86 results in finding that the document is located on the transportable storage media 38, then at step 90 a command is sent over the wide area network to obtain the date of the document requested. Such date serves as a version date identifying the date that the document was last updated. At step 92 such version date is received at the client computer 14 from the wide area network 10. At step 94, the time stamp 56 for the requested document is retrieved from the transportable storage media 38. Such step 94 may occur before, during or after any of the steps 90 and 92. The time stamp 56 as previously described corresponds to a specific document or documents on the media 38 or corresponds to all the documents on the media 38. At step 96 the retrieved time stamp 56 is compared with the received version date. If the version date is later than the time stamp, then the document as stored on the media 38 is considered to have been changed since the media 38 was pressed and distributed. Thus, such document is out of date. A current version then is downloaded from the wide area network at step 88 as previously described, and displayed for viewing. If the time stamp is at least as recent as the version date (i.e., the same or more recent), then the document as stored on the media 38 has not changed and is up to date. The document then is displayed at step 98 using the data stored on the transportable storage media 38. Once the document is displayed, whether from the wide area network download, the transportable storage media 38 access, or the RAM cache or disk cache access, normal processing resumes at step 84. Such step 84 of normal processing may include requesting viewing of another document (e.g., going to step 78), disconnecting from the wide area network, issuing another network access command using network interface software, shutting down the computer, switching to another application of the computer, or any of various other processing capabilities of the client computer 14. Although steps for checking a RAM cache and disk cache are described above, in other embodiments such steps may be omitted.

Figure 8:
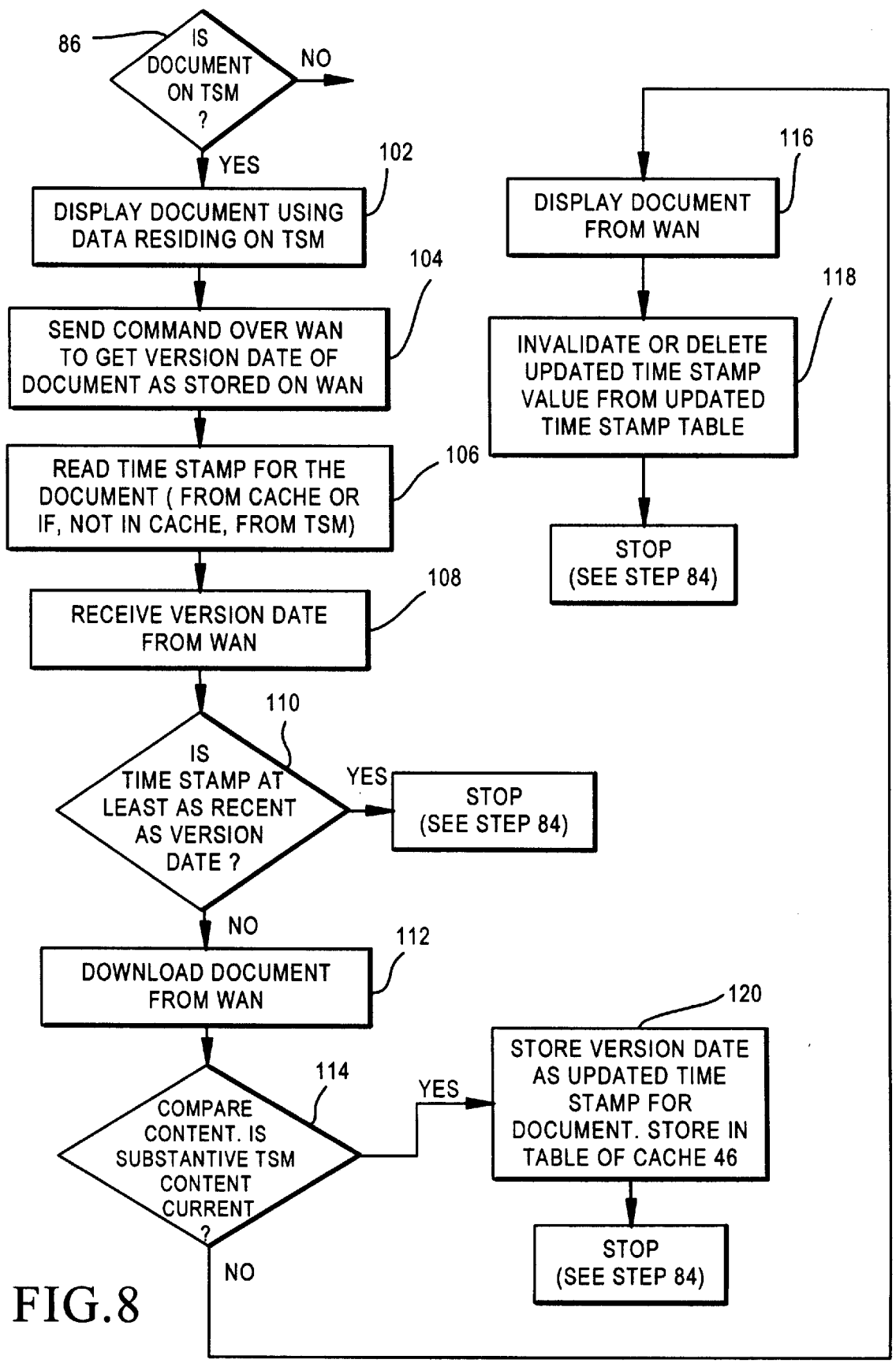
FIG. 8 is a flow chart of an alternative processing branch to a decision step in the flow chart of FIG. 7.

In an alternative embodiment, the steps vary along the affirmative branch of decision step 86. FIG. 8 shows a flow chart for an alternative processing branch to decision step 86. If affirmative, then at step 102 the document as found on the transportable storage media is displayed. At step 104 a command is sent over the wide area network to obtain the date of the document requested. At step 106 the updated time stamp table in the dedicated cache 46 is checked to see if the time stamp for the document has been updated. If updated, then the updated time stamp as found in the cache table is used in the subsequent comparison (step 110). If not updated, then the time stamp value from the transportable storage media 38 is used in the subsequent comparison (step 110). At step 108, the document version date is received from the wide area network. At step 110 the time stamp being used (e.g., the updated time stamp from cache 46 or the time stamp from the transportable storage media 38) is compared to the version date received. If the time stamp is at least as recent as the version date, then the document contents are considered to be current. The processing then is complete, because the current document content is already being displayed. If the version date is more recent then the time stamp, then at step 112 the document is downloaded from the wide area network. At step 114 the content of the document as downloaded is compared with the content as stored on the transportable storage media 38. If the substantive document content has changed, then the downloaded version is displayed at step 116 and an entry in the updated time stamp table is invalidated or deleted at step 118. If the substance of the document has not changed, then at step 120 the version date is stored in the updated time stamp table as the time stamp for the document. The current content of the document is being displayed so no additional processing is done. In some embodiments the substantive content referred to above is all of the document content. In other embodiments it is less than all of the content. For example in some embodiments a date field is not considered part of the substantive content for this analysis. This is because the value for such field changes every day. In another example, a counter field of the times the document has been accessed is not considered substantive content. The value in this field changes each time someone accesses the corresponding document over the wide area network. Note that the order of steps 102–106 may vary, and that the order of steps 116–118 may vary. Also note that step 102 may be performed along the affirmative branch of decision steps 110 and 114, instead of before decision step 110.

In another alternative embodiment the steps in FIG. 8, other than steps 114, 118 and 120, are performed. In such embodiment there is not an updated time stamp table. Thus the time stamp read in step 106 and the time stamp used in comparison step 110 is the time stamp as found on the transportable storage media 38. If the time stamp is at least as recent as the version date, then the document contents are considered to be current. The processing then is complete, because the current document content is already being displayed. If the version date is more recent then the time stamp, then at step 112 the document is downloaded from the wide area network. Then at step 116, the downloaded version is displayed.

In some embodiments the various steps for the methods described above may be distributed among multiple computers. For example, in some embodiments the step of displaying the document may occur at a different computer than the computer which accesses the transportable storage media and compares the document time stamp to the version date of the document as stored in the wide area network.

Meritorious and Advantageous Effects

According to one advantage of the invention, the average latency time from the time an end user issues a command to display a specific document to the time that such document is displayed is greatly reduced for transportable storage media documents which are updated only infrequently. Further, for a user who repeatedly accesses a common portion of the internet, overall latency time for accessing documents is greatly reduced when such portion is stored on the transportable media. According to another aspect of the invention, overall latency time for downloading a foreign language document is greatly reduced when all or much of the internet content in such language is provided on a transportable media periodically and accessible as a cache during on-line access.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for reducing latency time for viewing documents stored in a wide area network of network server computers, in which latency time is from a time at which a request to view a given document is made until a later time that such document is presented for viewing, the method comprising the steps of:

loading a transportable media into a first computer, the transportable media storing (i) a plurality of documents located on the wide area network, (ii) corresponding wide area network address identifications for said documents, and (iii) a time stamp;

forming an on-line connection between the first computer and the wide area network;

generating a command at the first computer to obtain a version date for a specific document stored on the wide area network, wherein said command is routed over the on-line connection to the wide area network;

receiving the version date in response to the routed command;

reading the time stamp for the specific document;

comparing the returned version date for the specific document to the time stamp;

displaying the specific document as stored on the transportable storage media;

wherein the time stamp is one of a plurality of time stamps stored on the transportable storage media, wherein there is a time stamp for each of the plurality of documents; and wherein the step of reading comprises reading said one time stamp corresponding to said specific document;

further comprising after the step of comparing, the steps of:

downloading the specific document from the wide area network when the version date is more current than the time stamp for the specific document;

displaying the specific document as downloaded from the wide area network either one of after or during the step of downloading; and either one of after or during the step of downloading, comparing the downloaded document with the corresponding document as stored on the transportable storage media, and after the step of comparing the downloaded document, the step of displaying the specific document as downloaded from the wide area network when select content of the downloaded document differs from corresponding content in the corresponding document as stored on the transportable storage media.

2. The method of claim 1, wherein the step of displaying the specific document as stored on the transportable storage media occurs when the select content of the downloaded document is the same as the corresponding content in the corresponding document as stored on the transportable storage media.

3. The method of claim 2, wherein the step of reading the time stamp comprises reading an updated time stamp for the specific document from an updated time stamp table, and further comprising the step of storing the received version date as the time stamp for the specific document in the updated time stamp table when the when the select content of the downloaded document is the same as the corresponding content in the specific document as stored on the transportable storage media.

4. The method of claim 1, wherein the select content excludes a today's date data portion.

5. The method of claim 1, wherein the select content excludes a count of times the specific document has been accessed.

6. A method for reducing latency time for viewing documents stored in a wide area network of network server computers, in which latency time is from a time at which a request to view a given document is made until a later time that such document is presented for viewing, the method comprising the steps of:

copying a plurality of documents stored in the wide area network onto a storage medium to generate a current version of select wide area network document content;

distributing transportable storage media storing the current version, wherein the transportable storage media includes the plurality of documents, corresponding wide area network address identifications for said documents, and a time stamp;

forming an on-line connection between a first computer and the wide area network;

generating a command at the first computer to obtain a version date for a specific document as stored in the wide area network, wherein said command is routed over the on-line connection to the wide area network;

receiving the version date at the first computer in response to the routed command;

reading the time stamp for the specific document;

comparing the returned version date for the specific document to the time stamp; and displaying the specific document as stored on the transportable storage media at least when the time stamp is at least as recent as the received version date.

7. The method of claim 6, wherein the time stamp is one of a plurality of time stamps stored on the transportable storage media, wherein there is a time stamp for each of the plurality of documents; and wherein the step of reading comprises reading said one time stamp corresponding to said specific document.

8. The method of claim 6, wherein the step of displaying comprises displaying the specific document on a second computer in communication with the first computer.

9. The method of claim 6, wherein the step of copying comprises copying a subset of documents stored in the wide area network onto a storage medium to generate a current version of select wide area network document content; and wherein the transportable storage media stores the current version of said subset of documents, said subset determined by select criteria.

10. A system, including a vendor and a plurality of clients, the system serving to reduce latency time for viewing documents stored in a wide area network of network server computers, wherein latency time occurs between a time at which a request to view a given document is made to a later time that such document is presented for viewing, the system comprising:

means for copying a plurality of documents stored in the wide area network onto a storage medium to generate a current version of select wide area network document content;

distributable transportable storage media which receive the current version, wherein the transportable storage media include the plurality of documents, corresponding wide area network address identifications for said documents, and a time stamp;

a first computer, including:

means for reading the transportable storage media;

means for forming an on-line connection with the wide area network;

processing means for generating a command to obtain a version date for a specific document stored in the wide area network, wherein said command is routed over the on-line connection to the wide area network, and in response the version date is returned; and processing means for comparing the returned version date for the specific document to the time stamp; and display means which displays the specific document as stored on the transportable storage media at least when the time stamp is at least as recent as the returned version date.

11. The system of claim 10, wherein the time stamp is one of a plurality of time stamps, said one time stamp corresponding to said specific document, and wherein there is a time stamp for each of the plurality of documents.

12. The system of claim 10, wherein the display means is part of the first computer.

13. The system of claim 10, wherein the first computer is a network server computer and further comprising a second computer, the second computer including the display means.

14. The system of claim 10, wherein the plurality of documents stored on the transportable storage media are a subset of all documents stored in the wide area network, said subset determined by select criteria.

15. A computer system for communicating with a wide area network, the wide area network storing a plurality of documents retrievable by the computer system, the computer system comprising:

a transportable storage media storing (i) a current version of the plurality of wide area network documents, (ii) corresponding wide area network address identifications for said plurality of wide area network documents, and (iii) a time stamp;

means for reading the transportable storage media;

means for forming an on-line connection with the wide area network;

processing means for generating a command to obtain a version date for a specific document stored in the wide area network to be displayed, wherein said command is routed over the on-line connection to the wide area network, and in response the version date is returned;

processing means for comparing the returned version date for the specific document to the time stamp;

display means which displays the specific document as stored on the transportable storage media at least when the time stamp is at least as recent as the returned version date, wherein the transportable storage media stores a respective time stamp for each one of the plurality of documents; and means for comparing the downloaded document with the corresponding document as stored on the transportable storage media, wherein the specific document as downloaded from the wide area network is displayed by the display means when select content of the downloaded document differs from corresponding content in the corresponding document as stored on the transportable storage media.

16. The computer system of claim 15, further comprising an updated time stamp table, wherein the received version date is stored as the time stamp for the specific document in the updated time stamp table when the select content of the downloaded document is the same as the corresponding content in the specific document as stored on the transportable storage media.

17. A computer system for communicating with a wide area network, the wide area network storing a plurality of documents retrievable by the computer system, the computer system comprising:

- a transportable storage media storing (i) a current version of the plurality of wide area network documents, (ii) corresponding wide area network address identifications for said plurality of wide area network documents, and (iii) a time stamp;
- means for reading the transportable storage media;
- means for forming an on-line connection with the wide area network;
- processing means for generating a command to obtain a version date for a specific document stored in the wide area network to be displayed, wherein said command is routed over the on-line connection to the wide area network, and in response the version date is returned;
- processing means for comparing the returned version date for the specific document to the time stamp;
- display means which displays the specific document as stored on the transportable storage media at least when the time stamp is at least as recent as the returned version date,
- wherein the storage media stores a respective time stamp for each one of the plurality of documents,
- means for downloading the specific document from the wide area network when the version date is more current than the time stamp for the specific document; and
- means for comparing the downloaded document with the corresponding document as stored on the storage media, wherein the specific document as downloaded from the wide area network is displayed by the display means when select content of the downloaded document differs from corresponding content in the corresponding document as stored on the storage media.

* * * * *